United States Patent [19]

Maisonneuve et al.

[11] 4,039,458
[45] Aug. 2, 1977

[54] APPARATUS FOR SEPARATION BY DECANTATION

[75] Inventors: Paul Maisonneuve, Communay; Paul Rouyer, Lyon, both of France

[73] Assignee: Rhone-Poulenc Industries, Paris, France

[21] Appl. No.: 629,964

[22] Filed: Nov. 7, 1975

[30] Foreign Application Priority Data

Nov. 8, 1974 France .............................. 74.37051

[51] Int. Cl.² ........................................... B01D 19/00
[52] U.S. Cl. .................................... 210/513; 137/173; 210/532 R; 210/539
[58] Field of Search ........ 210/532 A, 532 S, 533–536, 210/538, 539, 540, 513; 55/52, 189, 190; 137/171–173

[56] References Cited

U.S. PATENT DOCUMENTS

| 1,355,070 | 10/1920 | Allen | 210/532 R |
| 1,647,344 | 11/1927 | Cushman | 210/540 |
| 1,856,662 | 5/1932 | Showers et al. | 210/539 X |
| 3,558,282 | 1/1971 | Evans | 55/52 X |

*Primary Examiner*—Frank W. Lutter
*Assistant Examiner*—William A. Cuchlinski, Jr.
*Attorney, Agent, or Firm*—Cushman, Darby & Cushman

[57] ABSTRACT

A decantation separation apparatus in which the material to be separated flows upwardly through an annular weir, and overflows to a decantation zone defined between the weir and a surrounding jacket. The separated liquid is withdrawn from the bottom of the decantation zone and the separated lighter phase from the top of the jacket, an obstacle for example in the form of a thin plate, being provided in the decantation zone above the liquid outlet for slowing the velocity of liquid within the decantation zone.

13 Claims, 8 Drawing Figures

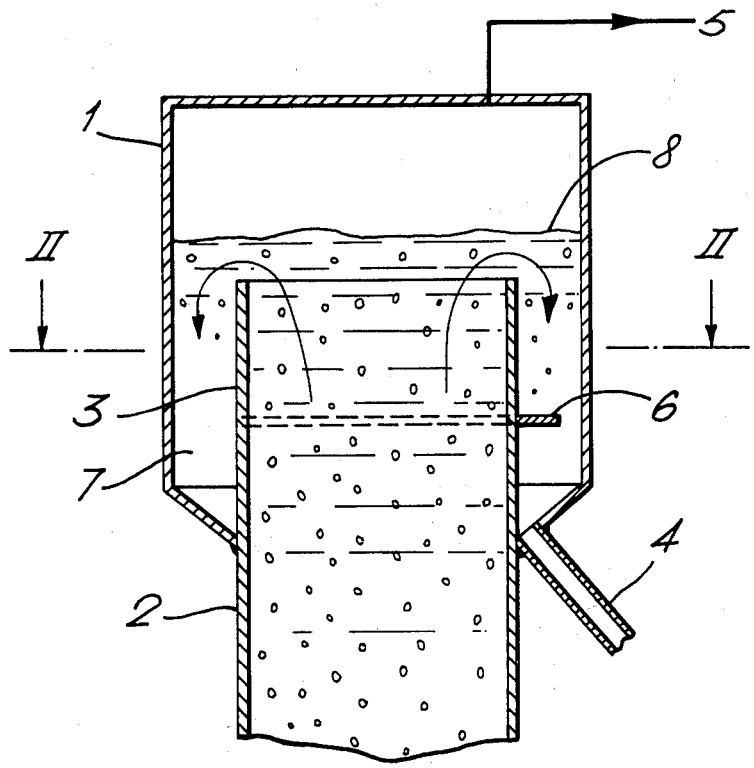

APPARATUS FOR SEPARATION BY DECANTATION

The present invention relates to apparatus for separation of heterogeneous mixtures of which the continuous phase is a liquid which is of higher density than the other phase of the mixture. The apparatus of the invention is particularly suitable for the separation, by decantation, of gas/liquid mixtures in which the continuous phase is liquid.

It is frequently necessary to disperse a gas phase in a liquid phase either in order to bring about a chemical reaction between the dispersed phase and the continuous phase or in order to ensure a physical exchange between the two phases. For this purpose, bubble columns are frequently used, in which the liquid continuously circulates vertically upwards and the gas phase is dispersed in the liquid phase by passing through small orifices located at the bottom of the column. At the top of the column it is generally desirable to provide as complete a separation as possible of the two phases which form the dispersion, or to bring about a predetermined degree of gas/liquid separation.

The most commonly used apparatus for separation by decantation consists of a vertical cylinder, hereafter called a "jacket", of which the diameter is greater than the diameter of the top of the column and which is placed along the axis of the column so that the upper part of the column extends into the separation apparatus. Hereafter, the portion of the column which is located inside the separation apparatus will be referred to as the "weir."

At the bottom of the separation apparatus the liquid phase flows through one or more pipelines, for example to another apparatus, whilst the gas phase is discharged through one or more pipelines located in the upper part of the separation apparatus.

In such an apparatus it is advantageous to regulate the level of the dispersion so that it is slightly above the upper edge of the weir, so as to achieve good gas/liquid separation conditions. In effect, too high a level favours the liquid phase being entrained by the gas phase, whilst too low a level causes eddies and favours bubbles being entrained by the liquid phase.

In this type of separation apparatus, the dispersion travels continuously vertically upwards into the weir and undergoes a change in direction of 180° at the outlet of the latter. Though the upper edge of the weir is immersed, the flow of the gas/liquid dispersion out of the weir towards the decantation zone, that is to say towards the annular space between the wall of the weir and the jacket of the apparatus, will be referred to as "overflow". In the course of the dispersion changing direction by 180°, only a part of the gas phase escapes towards the free surface of the dispersion and so the gas/liquid separation must continue in the decantation zone.

In its descending movement towards the outlet pipeline, the liquid phase entrains gas bubbles which cannot escape unless their ascending speed is greater than the vertical component of the local speed of overflow of the dispersion. It is thus rather difficult to regulate the local speed of overflow over the entire periphery of the weir so as to maintain its vertical component below the ascending speed of the gas bubbles and thus to stop a portion of the gas phase from being entrained into the outlet pipeline of the liquid phase.

It has thus been proposed, in order to avoid this entraining of bubbles, to locate the decantation zone eccentrically relative to the weir; a shift of the weir towards the outlet pipeline of the liquid phase or a shift in the opposite direction, does not improve the gas/liquid separation and even tends to cause more entraining of bubbles of the gas phase by the liquid phase into the outlet pipeline.

It is at times possible to improve the efficiency of the gas/liquid separation by using a decantation zone contained within a jacket of larger diameter, but this suffers from the disadvantage of requiring a bulky separation apparatus.

According to the present invention we provide apparatus for the separation of a heterogeneous mixture, including a continuous liquid phase of higher density than the other phase of the mixture, said apparatus comprising a jacket, a weir extending upwardly into said jacket and defining, between said jacket and the weir, a space forming a decantation zone, having an upper rim, at least one outlet for the liquid phase in the jacket connected to the space at a location below the upper rim of the weir, at least one outlet for the other phase in the jacket at a location above the upper rim of said weir; and at least one obstacle located in the decantation zone above the first outlet effective to ensure that the vertical component of the local speed of overflow is uniform over the length of the rim of the weir.

In order that the invention will be better understood, the following description is given, merely by way of example, reference being made to the accompanying drawings, in which:

FIGS. 4, 4A, 4B, 4C and 4D are fragmentary views, in section, of the upper parts of four different apparatuses for gas/liquid separation, and the change in speed of the liquid at various points of the decantation zone;

In the various embodiments like parts have been indicated by like reference numerals.

Figure 1:
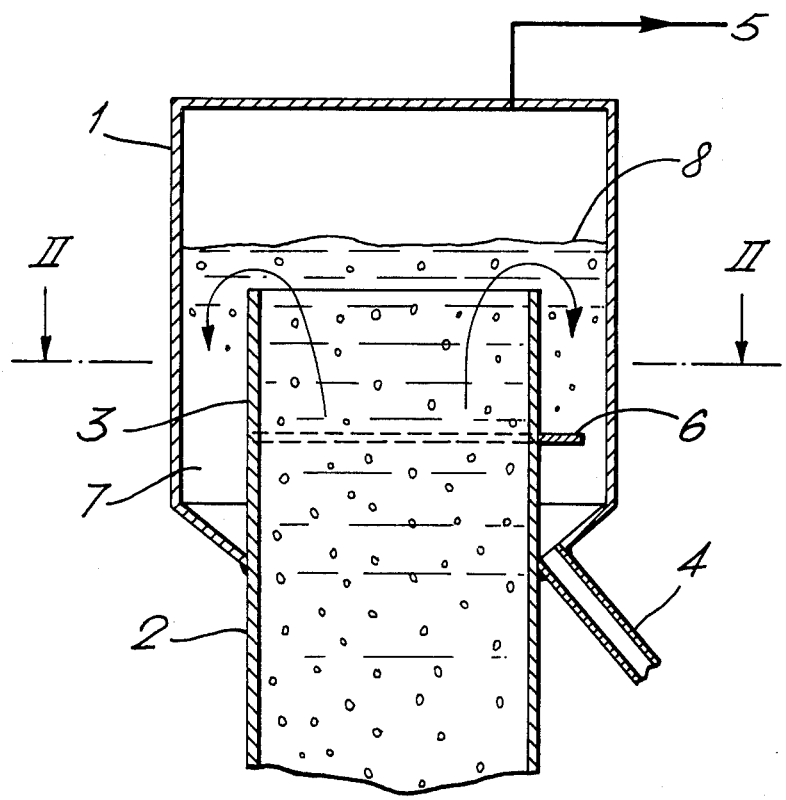
FIG. 1 is a side elevation, in cross-section through the axial plane of symmetry, of a bubble column top provided with one embodiment of apparatus according to the invention.
Figure 2:
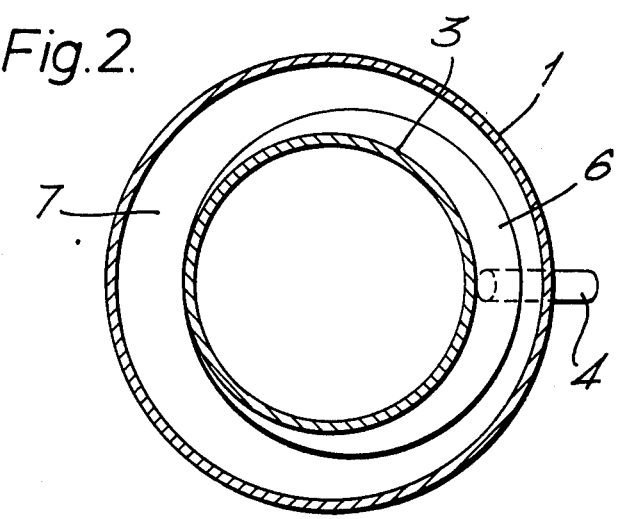
FIG. 2 is a cross-section taken along the plane II—II of the apparatus of FIG. 1.

The apparatus according to the invention, shown in cross-section in FIGS. 1 and 2, consists of a vertical cylindrical jacket 1 of which the diameter is greater than the diameter of the bubble column top 2 of which the apparatus is located. The jacket 1 is coaxial with the column 2, so that the upper part of the latter extends inside the separation apparatus and forms a weir 3. The annular space between the weir and jacket forms a decantation zone 7. At the bottom of the separation apparatus the liquid phase flows through a first outlet pipeline 4, for example to another apparatus, whilst the gas phase is discharged through a second outlet pipeline 5 located in the upper part of the separation apparatus.

A thin obstacle 6, of constant thickness but variable profile, that is to say an obstacle of which the horizontal dimension varies continuously from one of its ends to the other, is fixed, in the decantation zone 7, to the wall of the weir, at right angles to the axis of the apparatus. The thin obstacle 6 is so located that the distance between the latter and the jacket of the apparatus is minimum vertically above the outlet pipeline 4 for the liquid phase, whilst this distance is a maximum at the diametrically opposite point. The horizontal dimension of the thin obstacle is thus preferably zero near this point. The obstacle 6 is advantageously symmetrical relative to an axial plane which passes through the pipeline 4, and can consist of a metal sheet in the form of a crescent fixed, for example by welding, to the wall of the weir.

The jacket can optionally be of the same diameter as the top of the column 2 which extends into the separation apparatus by a weir of smaller diameter than that of the column.

The gas/liquid dispersion travels continuously vertically upwards in the column 2, and leaves the latter through the weir 3. The dispersion undergoes a change of direction of 180° at the rim of the weir, in the course of which a part of the gas phase escapes to the free surface 8 of the dispersion; the gas/liquid separation then continues in the decantation zone 7. The thin obstacle 6 now causes in the decantation zone 7, at a point of the periphery of the weir, an exceptional loss of pressure, which can be varied and is a function of the distance between the obstacle and the jacket of the apparatus and consequently a function of the position of this point on the periphery of the weir 3. These losses of pressure are greater vertically above the pipeline 4 than at a point diametrically opposite, as a result of the variable profile and the positioning of the thin obstacle. It is found that the presence of the thin obstacle 6 makes it possible to achieve a uniform vertical component of the local speed of overflow over the entire periphery of the weir. It is thus easy to maintain the vertical component of the local speed of overflow lower than the ascending speed of the gas bubbles which thus continue their vertical upward movement in the decantation zone 7 towards the free surface 8 of the dispersion, whilst the degassed liquid phase is discharged continuously through the pipeline 4 to another apparatus.

Advantageously, the thin obstacle of variable profile is located at between 0.05 and 0.95, and preferably between 0.2 and 0.8, of the height of the decantation zone. In fact, a thin obstacle too near to the upper edge of the weir hinders the ascending movement of the gas bubbles and does not make it possible to achieve the desired efficiency.

Figure 3:
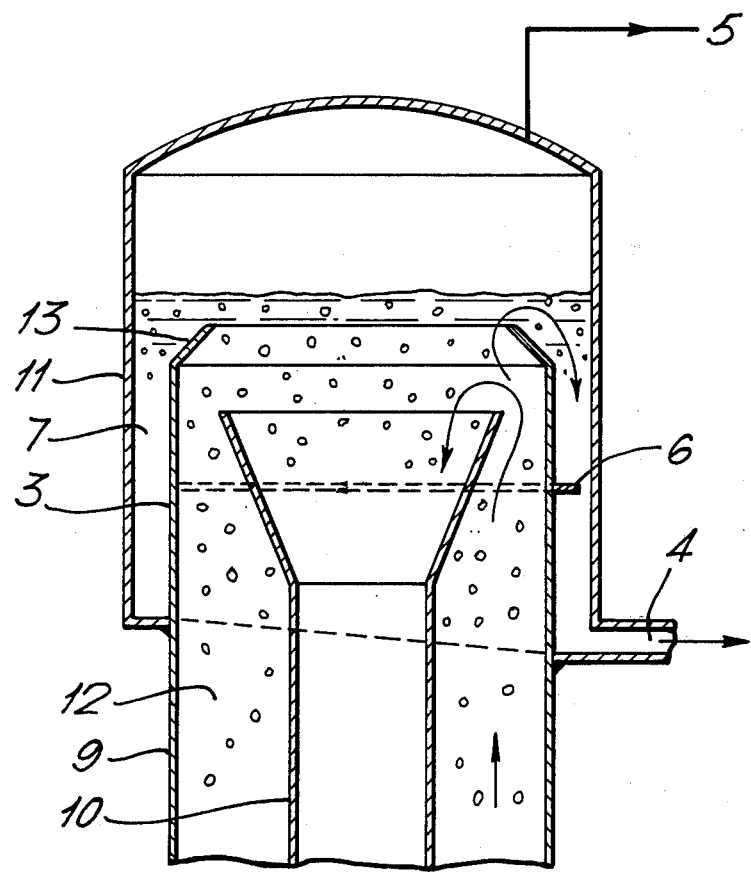
FIG. 3 is a side elevation, in cross-section through the axial plane of symmetry of a bubble column top provided with a second embodiment of apparatus according to the invention.

FIG. 3 shows a modified apparatus for gas/liquid separation by decantation located at the top of a continuously operating bubble column with internal recirculation of liquid. In such a column, the gas phase is, for example, dispersed continuously in an annular space located between the wall of the column 9 and a central recirculation tube 10. The upper part of the column is surmounted by a coaxial cylinder 3 which forms the weir. To the wall of the latter is fixed the thin obstacle 6 in the decantation zone 7 which is formed by the annular space between the wall of the weir and the jacket 11 of the apparatus.

The gas/liquid dispersion continuously rises in the annular space 12 located between the weir 3 and the central tube 10. A part of the dispersion is degassed by a change of direction of 180° at the upper edge of the central tube and forms a dense dispersion which again descends to the bottom of the column through the central tube 10. The other part of the dispersion escapes, through overflow above the weir 3, to the decantation zone 7. The gas/liquid separation of the dispersion takes place as before during the change of direction at the rim of the weir, and then continues in the decantation zone 7. In this decantation zone, the obstacle 6 ensures that the vertical component of the local speed of overflow is uniform over the periphery of the weir, and this component is kept at a value below the ascending speed of the gas bubbles by regulating the feed rate at the bottom of the column. The degassed liquid phase is then discharged continuously through the pipeline 4.

The obstacle 6 can optionally be combined with a truncated cone 13. In the absence of the truncated cone, a vortex tends to form in the decantation zone in the immediate vicinity of the vertical wall of the weir; this vortex reduces the free cross-section for the passage of the liquid to the decantation zone at the rim of the weir and thus causes an increase in the local speed of overflow. The function of the truncated cone is to localise, on the external face of its wall, the vortex which forms at the orifice of the weir. The absence of a vortex on the vertical wall of the weir avoids a reductioon in the cross-section for passage to the decantation zone, which reduces the local speed of overflow in the thickness of the liquid phase. The truncated cone 13 can be replaced by a part spherical zone or by a parabolic or ellipsoidal portion or optionally by any other curved geometrical surface. This curved geometrical surface can either have its concave face turned towards the outside or towards the inside of the weir and its projection onto a plane at right angles to the axis of the apparatus is entirely contained within the surface delimited by the projection of the wall of the weir onto the plane of cross-section.

Figure 6:
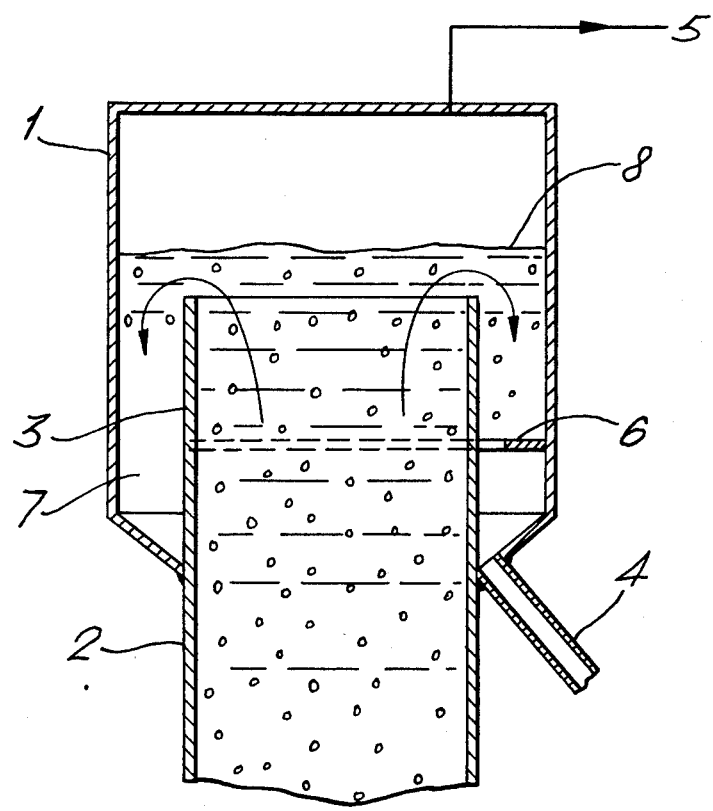
FIGS. 6 and 7 are views similar to FIG. 1 of two further embodiments.

Fixing of the obstacle 6 onto the jacket of the apparatus in the decantation zone is also possible (see FIG. 6). The obstacle is then again so located that the distance between it and the wall of the weir is a minimum vertically above the outlet pipeline 4 of the liquid phase and is a maximum at the diametrically opposite point.

Figure 7:
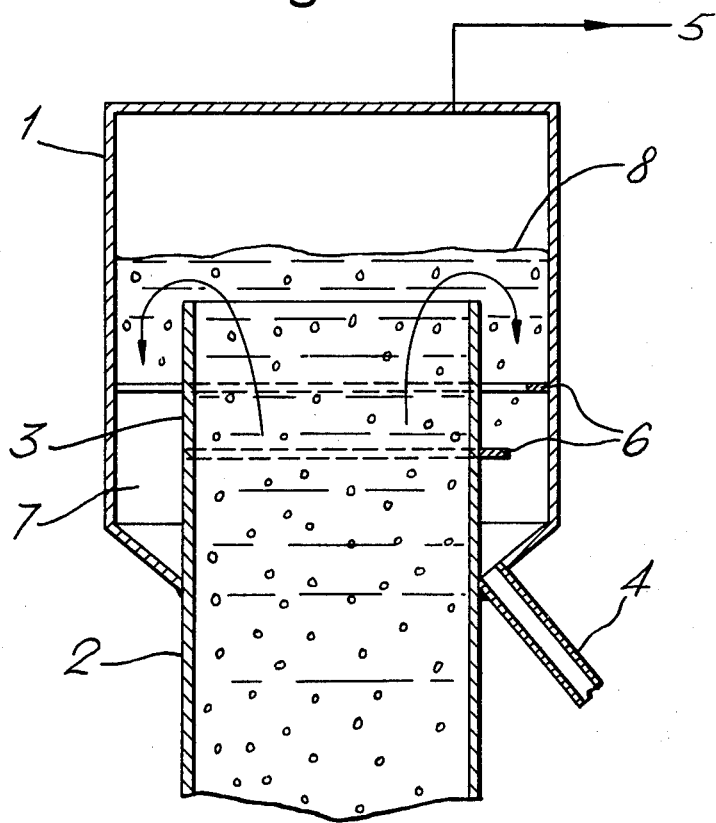

It is also possible to fix one or more obstacles to the wall of the weir and one or more obstacles to the jacket of the apparatus (see FIG. 7). The obstacles can be plane and inclined to the axis of the apparatus or perpendicular to this axis. The obstacle can optionally be adjustable in direction.

The obstacle can also be formed by a conical wall portion, the apex of the cone pointing either towards the upper part of the decantation zone or towards its lower part. The obstacle can optionally be a skew surface. These two types of obstacles, for example fixed to the wall of the weir, are so located that the free space between the obstacle and the jacket of this apparatus is a minimum vertically above the outlet pipeline of the liquid phase and a maximum at a diametrically opposite point. These obstacles can be positioned analogously on the jacket.

The obstacle of variable profile can optionally be replaced by a ring, for example at right angles to the axis of the apparatus, fixed both to the wall of the weir and to the jacket of the apparatus, this ring being provided with orifices which allow circulation of the liquid phase and are so distributed that the ratio of the surface of the orifices per unit surface of the ring varies so that it is a minimum vertically above the outlet pipeline of the liquid phase and increase regularly until it reaches a maximum at the diametrically opposite point. The orifices can be of varying area, or can all be of the same area and be distributed at a greater or lesser density.

It is also possible to replace the obstacle of variable profile by a three-dimensional body located in the decantation zone. This three-dimensional body is preferably such that the various cross-sections through a vertical plane containing the axis are similar but vary as a function of the position of the plane of cross-section, and the cross-section of the three-dimensional body through such a plane is a maximum vertically above the outlet pipeline of the liquid phase.

The three-dimensional body can be firmly fixed either to the wall of the weir or to the jacket of the apparatus and can have a constant radial dimension and be of variable height and can optionally be symmetrical relative to a horizontal plane.

The three-dimensional body of variable cross-section can also be spaced from both walls of the decantation zone in which case it is called a "dead body", and is firmly fixed to the apparatus by any known means, for example by fixing fingers. The dead body can optionally be such that its cross-section can be varied, for example by inflation.

Figure 8:
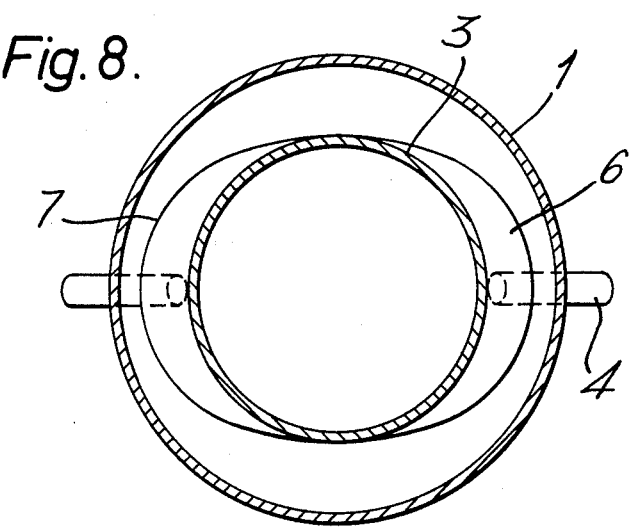
FIG. 8 is a view similar to FIG. 2 of a still further embodiment.

The apparatus of the invention can optionally be provided with several outlet pipelines of the liquid phase. In that case, (see for example FIG. 8) an obstacle of variable cross-section is used, in which the variations in cross-section are such that the maxima are located vertically above the outlet pipelines of the liquid phase and the minima are equidistant from two successive outlet pipelines.

Of course one of the above variants can be combined with a truncated cone as shown in FIG. 3. It is also possible to combine one or more of these variants with one another.

The apparatus of the invention has the advantage of improving the continuous gas/liquid separation by decantation of a heterogeneous mixture and makes it possible to obtain a liquid phase which is as free as possible from gas bubbles and even completely free from bubbles.

Another advantage of the apparatus according to the present invention is that it makes it possible to achieve higher discharge rates of liquid phase, without entraining bubbles, than the apparatuses according to the prior art.

The apparatus according to the invention also makes it possible to increase the capacity of the apparatus as a result of producing uniform speeds in the decantation zone. In effect, the average speed in the decantation zone is now substantially equal to the local speed of overflow and the annular surface of the decantation zone is thus used optimally.

Another advantage of such apparatus is that it can achieve a predetermined degree of gas/liquid separation. In effect, the use of an obstacle of adjustable direction, or of an obstacle of which the cross-section can be varied as desired, makes it possible to regulate the amount of gas phase entrained by the liquid phase.

Furthermore, the separation apparatus according to the invention is simple to construct and easy to operate.

The separation apparatus according to the present invention is advantageously used to separate, by decantation, heterogeneous gas/liquid mixtures with a continuous liquid phase; such mixtures are very commonly encountered in chemical processes.

The invention is in no way limited to the separation of heterogeneous gas/liquid mixtures. Such an apparatus can be used to separate heterogeneous liquid/liquid mixtures of which the continuous phase consists of the liquid phase of higher density. The operation of the apparatus, and its design, are in that case analogous to those described from the separation of heterogeneous gas/liquid mixtures.

EXAMPLE

A gas/liquid separation apparatus which forms the subject of the invention was studied experimentally using a mixture of air and water. For this purpose, a polyvinyl chloride model representing a gas/liquid oxidation reactor was constructed, the upper part of the reactor being surmounted by a gas/liquid separation apparatus as represented in FIG. 3. The model is given the following sizes:
diameter of the jacket 11 — 800 mm.
diameter of the weir 3 — 715 mm.
height of the weir — 600 mm.
position of the outlet pipeline 4 of the liquid phase: 450 mm below the upper edge of the weir.
diameter of the central tube 10 — 230 mm.
diameter of the upper part of the central tube 10 — 570 mm.
distance between the upper edge of the weir and the device for injecting air into the reactor — 3,400 mm.

At the bottom of the separator, the water leaving through the pipeline 4 was re-injected after having been made to pass through a supplementary degassing device which makes it possible to measure the amount of air entrained. The rate of flow of the water was varied by means of a centrifugal pump located in the external loop of the pump circulation.

During the experimental study, the flow rate of air was kept constant at 53 m$^3$/hr, measured under normal conditions of temperature and pressure, and the level of the dispersion was kept constant at 250 mm above the upper edge of the weir.

The air entrained in the pipeline 4 separated from the water in the degassing device and a gas-meter made it possible to measure the flow rate of entrained air.

The speeds of the water in the decantation zone were measured by means of a Pitot tube, the measurements being carried out in a horizontal plane located below the upper edge of the weir.

Figure 4:
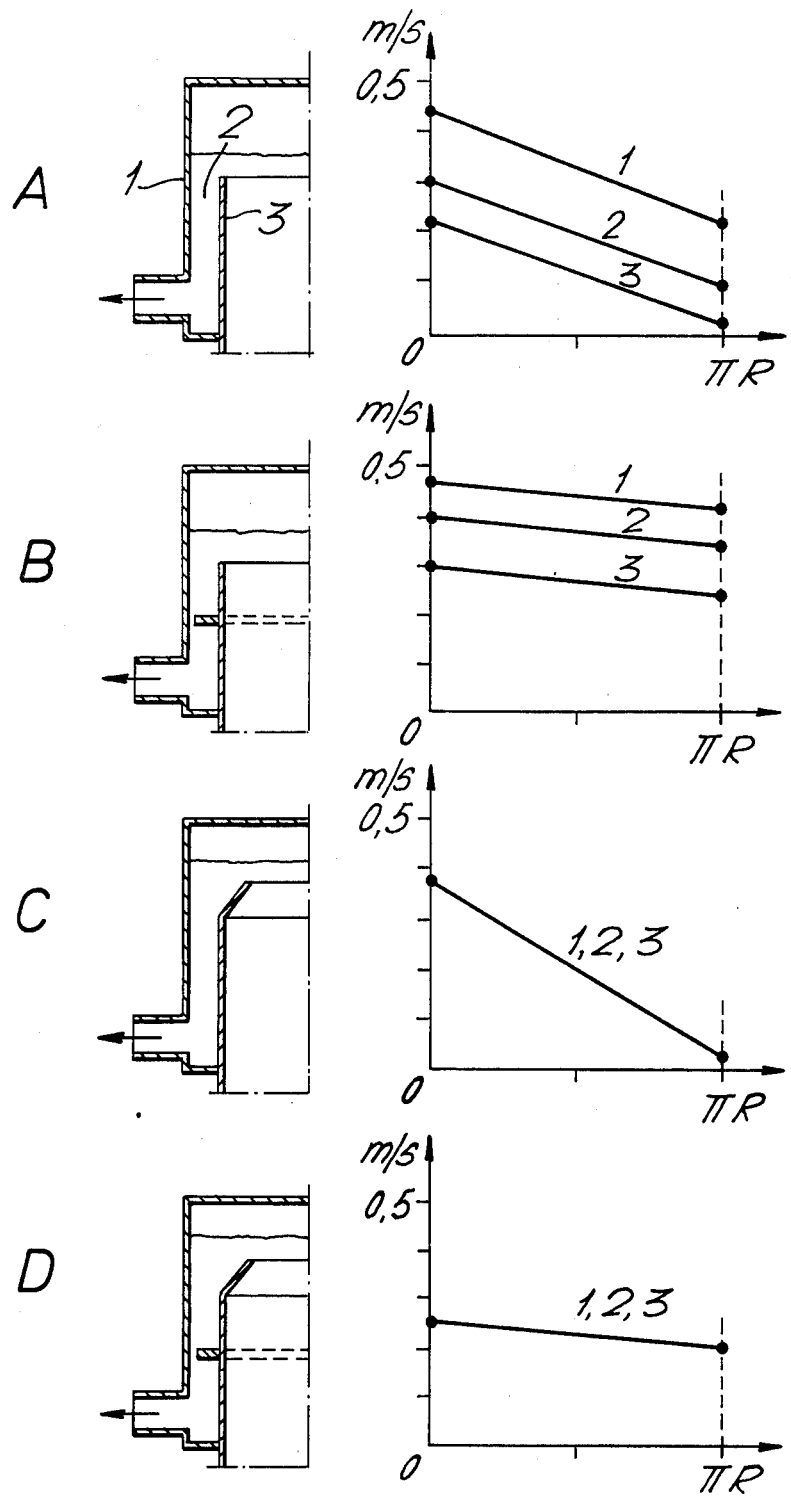

The FIG. 4, A, B, C and D represent the variations in the speed of the liquid at a point of the decantation zone as a function of the position of this point, at the periphery of the weir (O corresponds to vertically above the outlet pipeline $\pi$R to the diametrically opposite position). The measurements were carried out at points 1, 2 and 3, that is to say against the jacket of the apparatus (1), against the wall of the weir (3), and half-way between the jacket and the wall (2).

The FIG. 4A shows the variation in speeds in the decantation zone of an apparatus according to the prior art. It was found that the variation of speeds is substantially linear. The straight lines representing this variation at the points 1, 2 and 3, as a function of the position on the periphery of the weir, are well-differentiated and of sharp slope.

FIG. 4B shows that the use of the separation apparatus according to the invention, that is to say provided with an obstacle of variable profile on the wall of the weir, produces uniform local speeds of overflow over the entire periphery of the weir. In effect, it was found that the straight lines representing the variations in speed at points 1, 2 and 3, as a function of the position on the periphery of the weir, are still differentiated, but of low slope.

FIG. 4C shows a variation of speeds in the decantation zone of an apparatus according to the prior art provided with a truncated cone of apical angle 90° and of height 100 mm, located in the upper part of the weir. It was found that the straight lines representing the variations in speed at points 1, 2 and 3 as a function of the position on the weir coincide and the slope of the corresponding straight line remained sharp.

FIG. 4D shows a variation in speeds in the decantation zone of an apparatus according to the invention, that is to say provided, in the decantation zone, with an obstacle of variable profile fixed to the wall of the weir, with which a truncated cone had been combined. It is found that the straight lines representing the variations in speeds at points 1, 2 and 3 as a function of the position of the weir coincided and were of low slope. This corresponds to speeds of water which are identical over the thickness of the decantation zone and substantially constant over the periphery of the weir.

Figure 5:
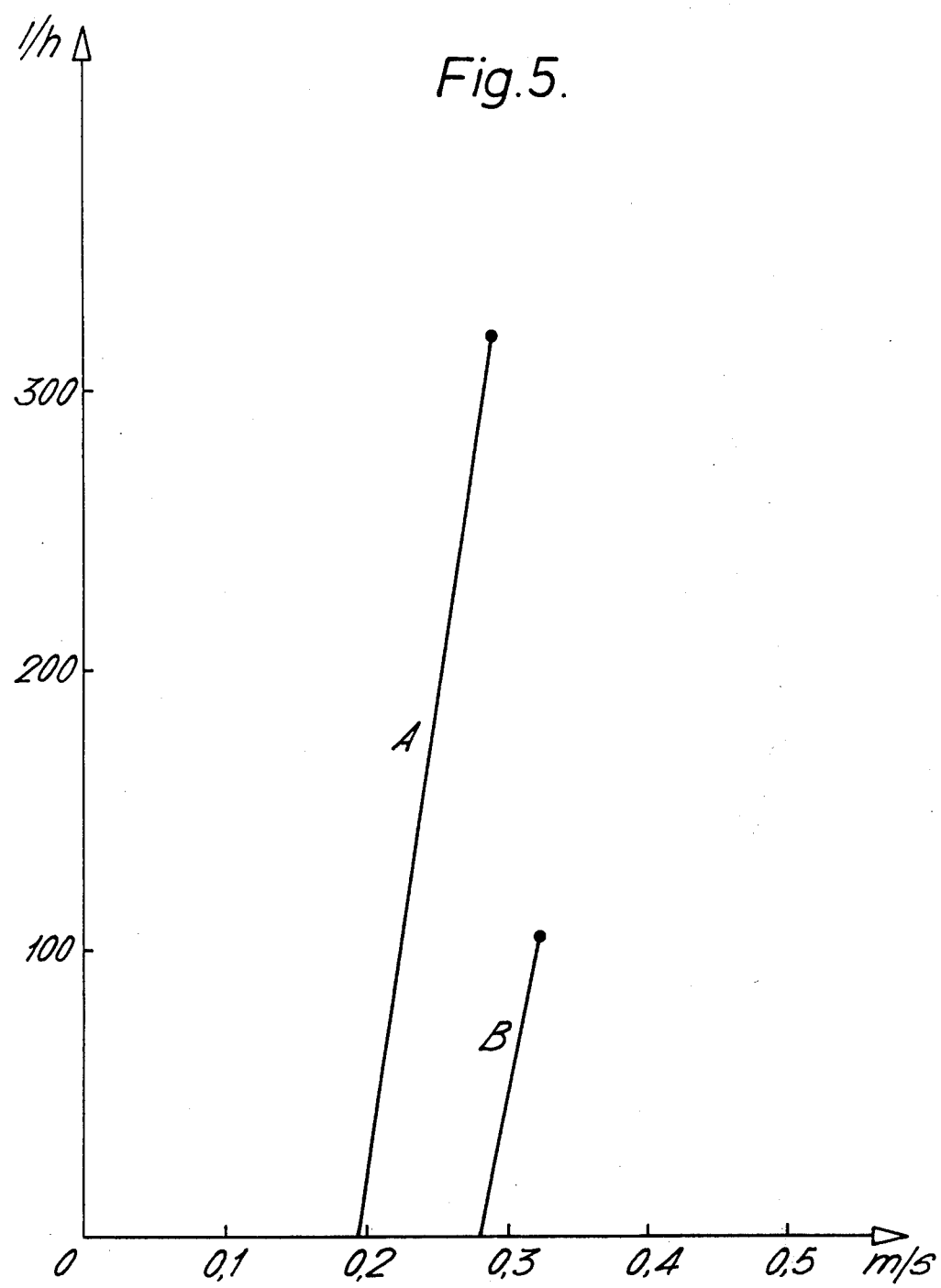
FIG. 5 shows the change in the rates at which the gas is entrained in the decantation zone, for various embodiments of the gas/liquid separation apparatus.

FIG. 5 shows the rates at which air is entrained in the decantation zone before (curve A) and after (curve B) placing in position an obstacle of variable profile and the truncated cone, as a function of the average speed of entraining in the decantation zone.

It was found that the use of the obstacle and of the truncated cone made it possible to increase by 50% the threshold beyond which air is entrained.

We claim:

1. Apparatus for the separation of a heterogeneous mixture, including a continuous liquid phase of higher density than the other phase of the mixture, said apparatus comprising:
   a. a jacket;
   b. weir extending upwardly into said jacket and defining, between the jacket and the weir, a space forming a decantation zone, said weir having an upper rim;
   c. at least one outlet for the liquid in the jacket connected to the space at a location below the upper rim of the weir;
   d. at least one outlet for the other phase in said jacket at a location above the upper rim of said weir; and
   e. at least one obstacle located in the decantation zone above the liquid outlet effective to ensure that the vertical component of the local speed of overflow is uniform over the length of the rim of the weir.

2. Apparatus as claimed in claim 1, wherein the weir is annular and defines between said jacket and the weir an annular space.

3. Apparatus as claimed in claim 1, wherein there is a single outlet for the liquid phase and the shape of said obstacle, as viewed in plan, varies progressively in said decantation zone, being at a maximum at a location above said outlet for the liquid phase and a minimum at a location most remote from said outlet for the liquid phase.

4. Apparatus as claimed in claim 3, wherein said at least one obstacle is secured to the wall of the weir.

5. Apparatus as claimed in claim 3, wherein said at least one obstacle is secured to the jacket in the decantation zone.

6. Apparatus as claimed in claim 3, wherein the obstacle of variable shape is in the form of a thin strip.

7. Apparatus as claimed in claim 3, wherein the obstacle is located in the decantation zone between 0.05 and 0.95 the height of a decantation zone.

8. Apparatus as claimed in claim 1, wherein there are a plurality of outlets for the liquid phase and the shape of the obstacle, as viewed in plan, varies progressively in said decantation zone, being at a maximum above said outlets and at a minimum at a location in the vertical plane equidistant between two adjacent outlets.

9. Apparatus as claimed in claim 1, wherein at least one obstacle is secured to the wall of the weir and at least one obstacle is secured to the wall of the jacket in the decantation zone.

10. Apparatus according to claim 1, wherein said at least one obstacle is in the form of a solid body spaced from the weir and the wall of the jacket within the decantation zone.

11. Apparatus according to claim 1, wherein the weir has an inturned surface at its upper rim.

12. Apparatus as claimed in claim 11, wherein said surface is in the form of a truncated cone.

13. Apparatus as claimed in claim 1, and further comprising an overflow tube located within said weir and having an upper edge below the rim of the weir, said overflow tube being connectable to means for recycling liquid to flow upwardly through said weir.

* * * * *